United States Patent
Wu et al.

(10) Patent No.: US 9,730,129 B2
(45) Date of Patent: Aug. 8, 2017

(54) PDCP OPERATION FOR DUAL CONNECTION

(71) Applicant: Nokia Solutions and Networks Oy, Espoo (FI)

(72) Inventors: Chunli Wu, Beijing (CN); Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 14 days.

(21) Appl. No.: 14/783,467

(22) PCT Filed: Apr. 12, 2013

(86) PCT No.: PCT/CN2013/074140
§ 371 (c)(1),
(2) Date: Oct. 9, 2015

(87) PCT Pub. No.: WO2014/166106
PCT Pub. Date: Oct. 16, 2014

(65) Prior Publication Data
US 2016/0066241 A1    Mar. 3, 2016

(51) Int. Cl.
*H04W 36/28* (2009.01)
*H04W 76/02* (2009.01)
*H04W 76/04* (2009.01)

(52) U.S. Cl.
CPC ......... *H04W 36/28* (2013.01); *H04W 76/025* (2013.01); *H04W 76/046* (2013.01); *H04W 76/028* (2013.01)

(58) Field of Classification Search
CPC . H04W 36/28; H04W 76/046; H04W 76/025; H04W 76/028
See application file for complete search history.

(56) References Cited

U.S. PATENT DOCUMENTS

2009/0316664 A1*  12/2009  Wu ............... H04W 76/028
                                                370/336
2012/0142361 A1    6/2012  Zhao et al.
(Continued)

FOREIGN PATENT DOCUMENTS

| CN | 101729396 A | 6/2010 |
| CN | 101997660 A | 3/2011 |
| CN | 102026324 A | 4/2011 |

OTHER PUBLICATIONS

R2-131327, Interdigital Communications: "User Plane Architecture for Dual-Connectivity", 3GPP Draft; Apr. 6, 2013 (Apr. 6, 2013), XP050699485, Retrieved from the Internet: URL : http://www.3gpp.org/ftp/tsg_ran/WG2_RL2/TSGR2_81bis/Docs/ [retrieved on Apr. 6, 2013] * paragraphs [02.1]-[2.2.2].

(Continued)

*Primary Examiner* — Brian D Nguyen
(74) *Attorney, Agent, or Firm* — Harrington & Smith (57) ABSTRACT

An apparatus of a communication network detects that a modification of a radio resource control connection for a user equipment is required. The apparatus decides, based on the detected modification requirement, if a re-establishment of a packet data convergence protocol is required for a first radio bearer and/or a second radio bearer, and indicates, in a radio resource control reconfiguration message, the first radio bearer and/or the second radio bearer for which re-establishment of the packet data convergence protocol is required. The user equipment detects, from the radio resource control reconfiguration message, that a modification of a radio resource control connection between the user equipment and the communication network is required, and re-establishes the packet data convergence protocol for the first radio bearer and/or the second radio bearer in accordance with the indication set in the radio resource control reconfiguration message.

15 Claims, 7 Drawing Sheets

(56) References Cited

U.S. PATENT DOCUMENTS

| | | | |
|---|---|---|---|
| 2012/0307741 A1 | 12/2012 | Wu | |
| 2012/0315878 A1* | 12/2012 | Deng | H04W 12/10 |
| | | | 455/411 |
| 2013/0094467 A1* | 4/2013 | Kwon | H04L 5/001 |
| | | | 370/329 |
| 2013/0258967 A1* | 10/2013 | Watfa | H04W 76/00 |
| | | | 370/329 |
| 2013/0301509 A1* | 11/2013 | Purnadi | H04L 65/4076 |
| | | | 370/312 |
| 2014/0233454 A1* | 8/2014 | Speight | H04W 88/04 |
| | | | 370/315 |

OTHER PUBLICATIONS

3GPP TS 36.331 V11.3.0 (Mar. 2013), "$3^{rd}$ Generation Partnership Project; Technical Specification Group Radio Access Network; Evolved Universal Terrestrial Radio Access (E-UTRA); Radio Resource control (RRC); Protocol specification (Release 11)", 344 pgs.

3GPP TSG-RAN WG2 #81, St. Julian's, Malta, Jan. 28-Feb. 1, 2013, Tdoc R2-130324, "Discussion on U-plane architecture for dual connectivity", 6 pgs.

3GPP TSG-RAN WG2 Meeting #81, Malta, Jan. 28-Feb. 1, 2013, R2-130453, "Discussion on small cells dual connectivity", 5 pgs.

3GPP TSG-RAN2# 81, Jan. 28-Feb. 1, 2013, R2-130488, "Necessity of C-plane architecture enhancements for dual connectivity", 4 pgs.

* cited by examiner

PDCP OPERATION FOR DUAL CONNECTION

BACKGROUND OF THE INVENTION

Field of the Invention

The present invention relates to a communication system such as LTE-A, and in particular to a PDCP operation when a user equipment has a dual connection, i.e., is connected to different base stations of a communication network, which serve different radio bearers.

Related Background Art

The following meanings for the abbreviations used in this specification apply:
CA carrier aggregation
CN core network
CP control plane
eNB evolved NodeB
EPS evolved packet system
GPRS general packet radio service
GTP GPRS tunneling protocol
GW gateway
HO hand over
IP internet protocol
L1L2 layer 1 layer 2
LCH logical channel
LCP logical channel prioritization
LTE long term evolution
LTE-A LTE advanced
MAC medium access control
RAN radio access network
RLC radio link control
RRC radio resource control
S serving
SRB signaling resource block
PDCP packet data convergence protocol
PHY physical layer
UDP user datagram protocol
UE user equipment
UP user plane
Uu air interface between UE and eNB
X2 interface between eNBs A dual connection comprises e.g. dual connectivity of a UE to both macro eNB and pico eNB of a communication network. In addition, inter-site CA introduces the possibility of carrier aggregation between different eNBs, which also requires dual connectivity to multiple eNBs from UE point of view.

Figure 1:
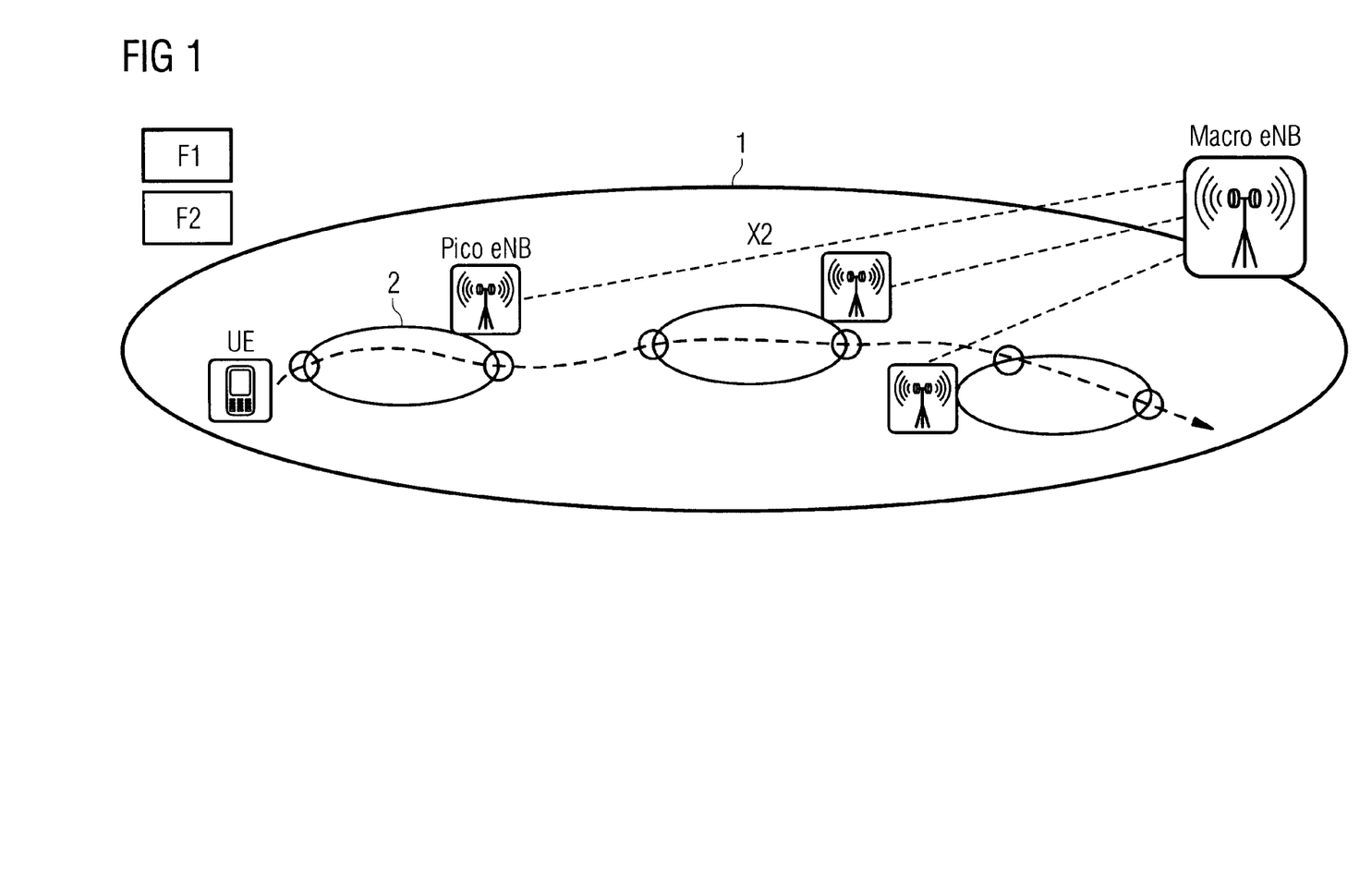
FIG. 1 shows a schematic diagram illustrating a dual connection of a UE to a macro eNB and a pico eNB.

FIG. 1 shows a dual connection of a UE to a macro eNB serving a radio bearer F1 in a macro cell 1, and to a pico eNB serving a radio bearer F2 in a pico cell 2. The pico eNB and the macro eNB may communicate over an X2 interface. PDCP for different EPS bearers could be terminated differently at macro eNB or pico eNB.

FIG. 1 shows further pico eNBs of pico cells in the macro cell 1, to which the UE may hand over, which is indicated by the dashed line in FIG. 1.

A handover or RRC reconfiguration of the UE may occur from one pico eNB to another while the UE is still connected to the macro eNB. However, current PDCP operation (no PDCP reset for RRC reconfiguration or full PDCP reset for Handover) is not efficient for this event.

SUMMARY OF THE INVENTION

The present invention aims at overcoming the above drawback and at providing a PDCP operation for dual connection. For example, the invention aims at providing PDCP operation enhancement for RRC reconfiguration procedure for both independent PDCP and master/slave PDCP structure.

This is at least in part achieved by the methods and apparatuses defined in the appended claims. The invention may also be implemented by a computer program product.

According to an exemplary embodiment of the invention, a per-bearer PDCP re-establishment is introduced in LTE-A, when a UE is connected to different eNBs and each eNB serves different radio bearers. For example, the UE has a dual connection to a macro eNB and a pico eNB. A handover/reconfiguration may occur from one pico eNB to another while the UE is still connected to the macro eNB. In such a case only a partial re-establishment is required. A new information element is added in an RRC reconfiguration message (e.g. "RRCConnectionReconfiguration" defined in 3GPP TS 36.331 v11.3.0) that indicates if a PDCP re-establishment/status report is to be triggered or not.

In the following the invention will be described by way of embodiments thereof with reference to the accompanying drawings.

DESCRIPTION OF THE EMBODIMENTS

One of the main issues for dual connectivity is how to perform data splitting between different eNBs. For example, data splitting may be performed at CN, at PDCP layer as depicted in FIG. 2A, with master PDCP in macro eNB and slave PDCP in pico eNB as depicted in FIG. 2B, or at RLC layer as depicted in FIG. 2C.

Figure 2A:
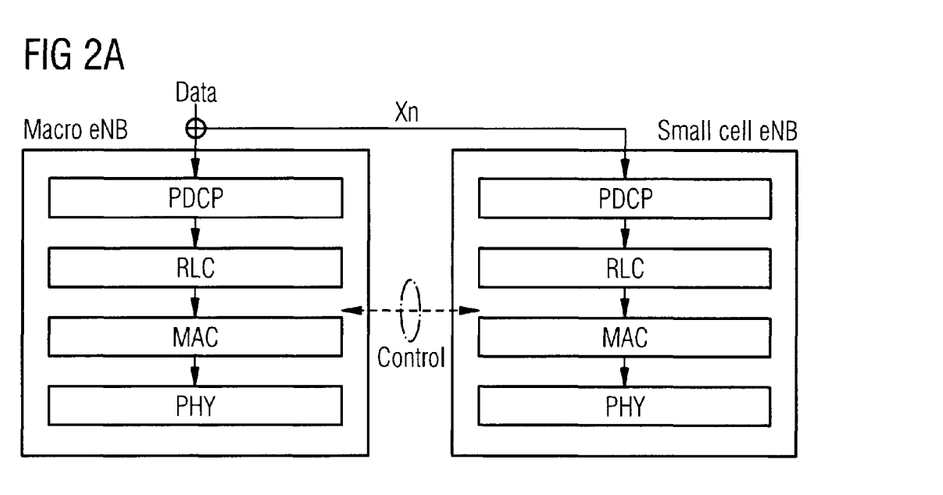
FIGS. 2A to 2C show UP layer structures for different data splitting approaches.

FIG. 2A shows a UP structure with independent PDCP entities (on top of layers PHY, MAC and RLC) at macro eNB and small cell eNB. The macro eNB and the small cell eNB may communicate over an Xn interface. In case data splitting is performed in the CN as illustrated in FIG. 3B, communication over the Xn interface is not required for PDCP operation.

Figure 2B:
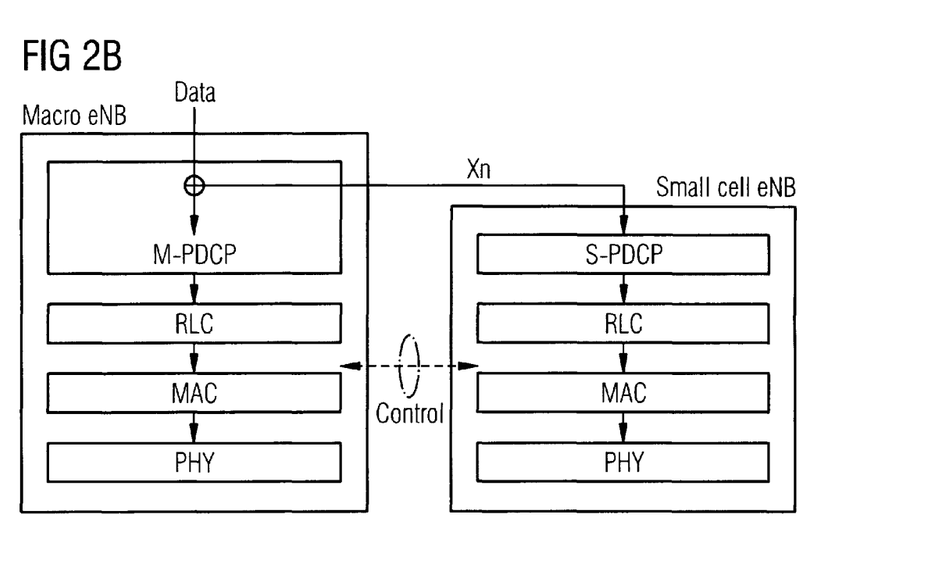

FIG. 2B shows a UP structure with master and slave PDCP entities. In this case, the macro eNB comprises a master PDCP entity (M)-PDCP, and the small cell eNB comprises a slave PDCP entity S-PDCP, where the (M)-PDCP performs SN allocation, head compression, ciphering/integrity protection and re-ordering for UL data. The macro eNB and the small cell eNB communicate over an Xn interface for PDCP operation.

Figure 2C:
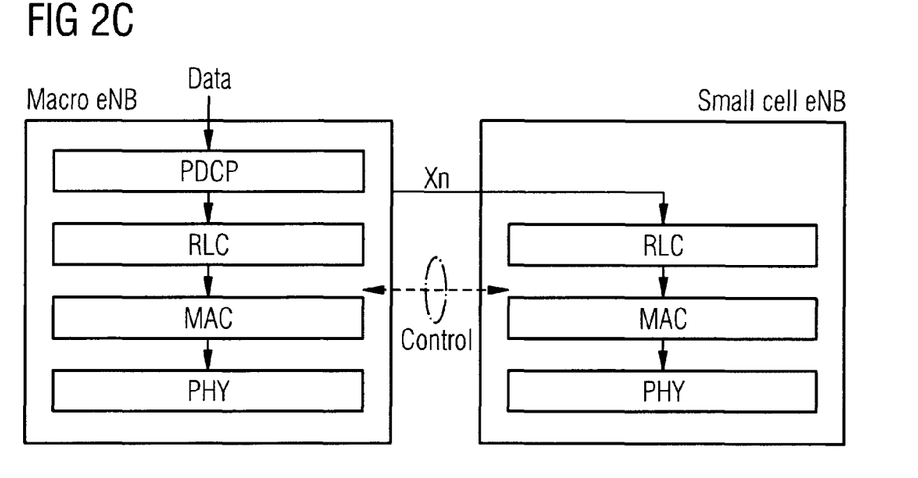

FIG. 2C shows a UP structure with a centralized PDCP entity at the macro eNB. In this case, a UE is connected to the small cell eNB via RLC layer. The macro eNB and the small cell eNB communicate over an Xn interface for PDCP operation.

Figures 3A, 3B, 3C, 3D:
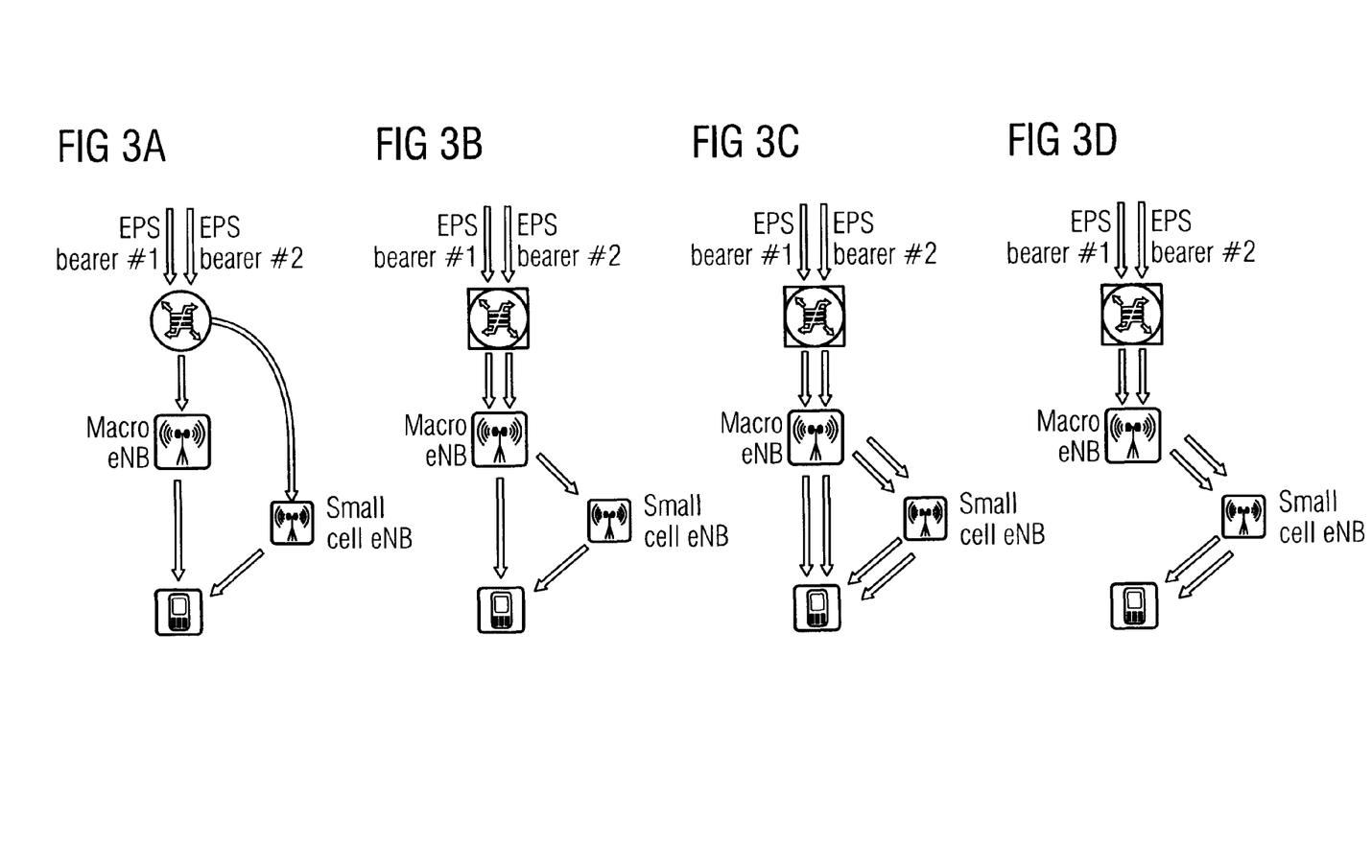
FIGS. 3A to 3D show schematic diagrams illustrating alternatives for data splitting at CN or RAN.

FIGS. 3B, 3C and 3D show data splitting at RAN. The macro eNB receives data from a gateway and forwards data intended for the small cell eNB over the Xn interface to the small cell eNB. The UE and the macro eNB communicate data on an EPS bearer #1, and the UE and the small cell eNB communicate data on an EPS bearer #2 (as shown in FIG. 3B), or all the bearers are communicated via small cell eNB (as shown in FIG. 3D).

FIG. 3A shows data splitting at CN. The gateway forwards data intended for the macro eNB to the macro eNB and data intended for the small cell eNB to the small cell eNB. The UE and the macro eNB communicate data on an EPS bearer #1, and the UE and the small cell eNB communicate data on an EPS bearer #2.

Concerning backhaul capacity and delay, the independent PDCP approach shown in FIG. 2A is an appealing option for dual connectivity, as it is applicable to data splitting at either CN or RAN or local breakout with loose delay requirement between eNBs. In other words, the independent PDCP approach is applicable to the alternatives illustrated in FIGS. 3A and 3B with different eNBs serving different radio bearers.

The master/slave PDCP approach shown in FIG. 2B makes it possible to serve same or different bearer with different eNBs and is applicable to the alternatives shown in FIGS. 3B, 3C and 3D. The alternative shown in FIG. 3D in which all bearers are communicated via the small cell eNB is a special case of the alternative shown in FIG. 3B.

According to an exemplary embodiment of the invention, PDCP operation enhancement for RRC reconfiguration procedure is provided for both the independent PDCP approach and the master/slave PDCP approach.

The purpose of an RRC connection reconfiguration is to modify an RRC connection, e.g. to establish/modify/release RBs, to perform handover, to setup/modify/release measurements, to add/modify/release SCells (serving cells).

Figure 4A:
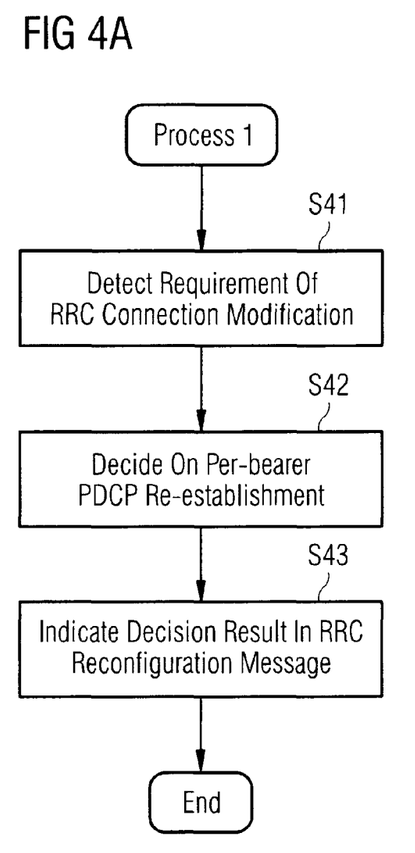
FIGS. 4A and 4B show flowcharts illustrating processes of PDCP operation for dual connection according to exemplary embodiments of the invention.

FIG. 4A shows a flowchart illustrating process 1 of a PDCP operation for dual connection according to an exemplary embodiment of the invention. The process 1 may be performed by a RAN of a communication network, e.g. by an eNB as shown in FIGS. 1, 2A-C and 3A-3D.

In step S41, it is detected that a modification of a RRC connection for a UE (e.g. the UE illustrated in FIGS. 1, 2A-C and 3A-3D) is required.

According to an exemplary embodiment of the invention, the UE communicates with the communication network by using the second radio bearer.

According to an alternative exemplary embodiment of the invention, the UE communicates with the communication network by using a first radio bearer and the second radio bearer.

According to an exemplary embodiment of the invention, a PDCP for the second radio bearer is terminated in a second base station (e.g. pico eNB) of the communication network, and a PDCP for the first radio bearer is terminated in a first base station (e.g. macro eNB) of the communication network, as shown e.g. in FIGS. 3A and 3B.

According to an alternative embodiment of the invention, PDCP for the second radio bearer is terminated in the second base station and PDCP for the first radio bearer is terminated in the second base station of the communication network, as shown e.g. in FIG. 3D.

For example, the second base station is to be changed to a third base station.

In step S42, it is decided, based on the detected modification requirement, if a re-establishment of the PDCP is required for the first radio bearer and/or the second radio bearer.

In step S43, in an RRC reconfiguration message, the first radio bearer and/or the second radio bearer is indicated, for which re-establishment of the PDCP is required.

According to an exemplary embodiment of the invention, in step S42 it is decided, based on the detected modification requirement, that a PDCP status report for the first radio bearer and/or the second radio bearer is to be sent by the UE, and in step S43 it is indicated, in the RRC reconfiguration message, that the status report is to be sent.

According to an exemplary embodiment of the invention, in step S42 it is decided to which base station of the communication network the status report is to be sent, and in step S43 the base station is indicated in the RRC reconfiguration message. The base station may comprise the first base station, the second base station or a third base station of the communication network.

According to an exemplary embodiment of the invention, a dedicated information element is added to the RRC reconfiguration message, in which the indications of step S43 are set.

According to an exemplary embodiment of the invention, a status report received from the UE is forwarded to the first or second base station or to a third base station of the communication network, e.g. via an X2 interface.

According to an exemplary embodiment of the invention, the first base station comprises at least a part of functionalities of the PDCP for the second radio bearer. These functionalities for the second radio bearer may comprise any of sequence number allocation, header compression, ciphering, integrity protection and/or reordering for uplink data.

Figure 4B:
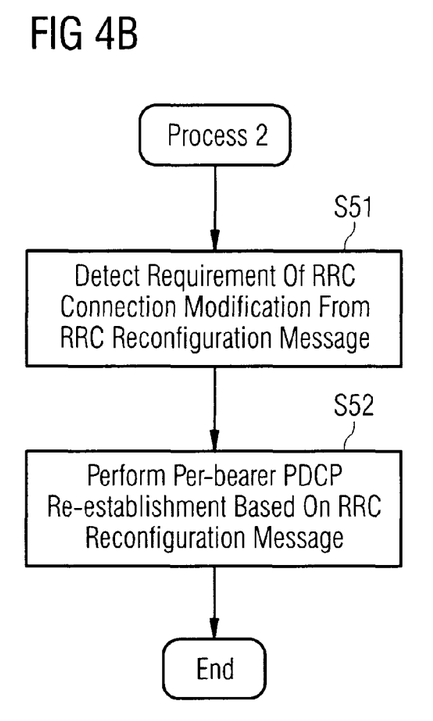

FIG. 4B shows a flowchart illustrating a process 2 of a PDCP operation for dual connection according to an exemplary embodiment of the invention. The process 2 may be performed by a UE, e.g. by the UE as shown in FIGS. 1, 2A-C and 3A-3D. The UE communicates with a communication network via a first radio bearer and a second radio bearer, or only via the second radio bearer. PDCP for the first radio bearer is terminated in a first base station (e.g. macro eNB) of the communication network as illustrated e.g. in FIGS. 3A and 3B, or is terminated in a second base station (e.g. pico eNB) of the communication network as illustrated e.g. in FIG. 3D, and PDCP for the second radio bearer is terminated in the second base station.

In step S51, it is detected, from an RRC reconfiguration message, that a modification of an RRC connection between the UE and the communication network is required.

In step S52, the PDCP is re-established for the first radio bearer and/or the second radio bearer in accordance with an indication set in the RRC reconfiguration message.

According to an exemplary embodiment of the invention, in step S51 it is detected, from the indication, that a PDCP status report for the first radio bearer and or the second radio bearer is to be sent.

According to an exemplary embodiment of the invention, in step S51 it is detected, from the indication, to which base station of the communication network the status report is to be sent. The base station may comprise the first base station, the second base station or a third base station of the communication network.

According to an exemplary embodiment of the invention, the indication comprises a dedicated information element added to the RRC reconfiguration message.

Figure 5:
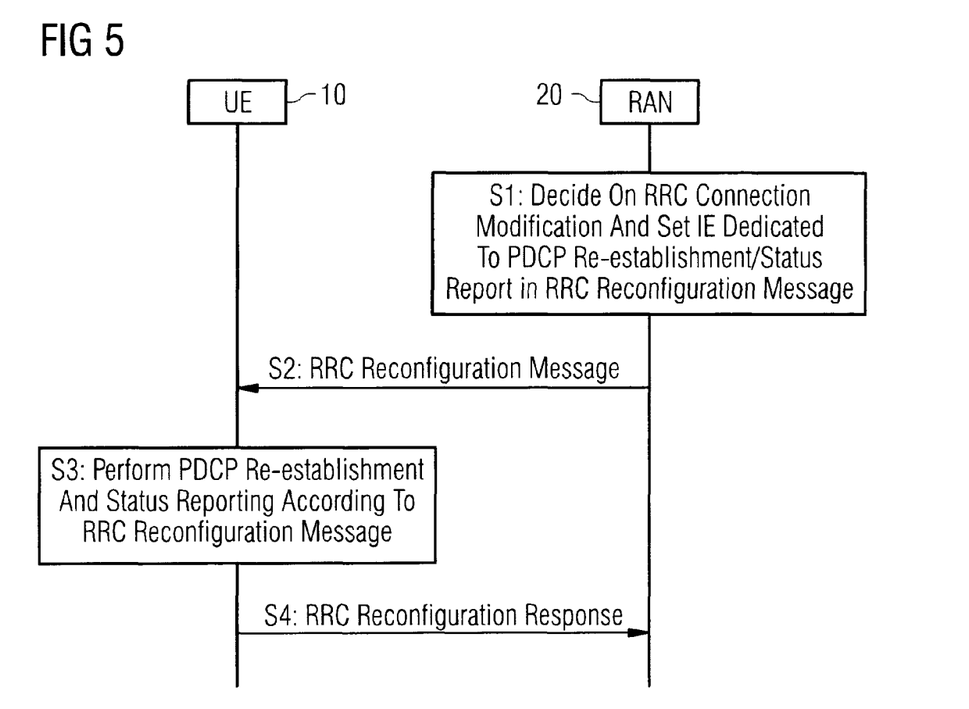
FIG. 5 shows a signaling diagram illustrating an implementation example of the PDCP operation for dual connection according to the present invention.

FIG. 5 shows a signaling diagram illustrating an implementation example of a PDCP operation for dual connection according to the present invention. A UE 10 has a dual connection to eNBs of a RAN 20, which serve different radio bearers. The independent PDCP approach as shown in FIG. 2A or the master/slave PDCP approach shown in FIG. 2B may be adopted by the UE 10 and the RAN 20.

The RAN 20, e.g. an apparatus of the RAN 20 such as an eNB shown in FIGS. 1, 2A-C and 3A-3D, decides in step S1 on an RRC connection modification and sets an IE dedicated to PDCP re-establishment/status report in an RRC reconfiguration message in accordance with the decided modification. The processing in step S1 corresponds to that in steps S41-S43 of FIG. 4A.

In step S2, the RAN 20 sends the RRC reconfiguration message to the UE 10, e.g. the UE as shown in FIGS. 1, 2A-C and 3A-3D, via a Uu interface.

In step S3, the UE 10 performs PDCP re-establishment and status reporting according to the received RRC reconfiguration message, and replies to the RAN 20 with a RRC reconfiguration response in step S4. The processing in step S3 corresponds to that in steps S51-S52 of FIG. 4B.

According to an implementation example of the invention, for inter-site CA a PDCP re-establishment/PDCP status report is triggered upon SCell reconfiguration, if requested by the RAN 20 in the RRC reconfiguration message. It is possible to explicitly configure only certain radio bearer(s) and/or to which base station/cell the status report should be sent to.

According to an implementation example of the invention, in case the UE 10 is connected to a pico eNB and a macro eNB as shown in FIG. 1, for SRBs there is no need to perform PDCP re-establishment as they are likely to be served via the macro cell (e.g. CP in macro cell and UP in pico cell).

In order to direct a status report to a given cell, a UE MAC layer needs to know to which serving cell a status report received on a logical channel needs to be sent. According to an implementation example of the invention, this relationship between a logical channel and a serving cell is configured by the eNB of the RAN 20 and requires the UE 10 to be aware of incoming status reports. According to an alternative implementation example of the invention, the first MAC PDU(s) after SCell reconfiguration are always directed towards that preferred serving cell in order to guarantee the delivery of the status report to the correct cell (as status reports are prioritized). Here, too, the correspondence between a logical channel and a preferred cell is configured by the RAN 20.

According to an implementation example of the invention, if prioritization on the UE side is not desirable (e.g. to avoid LCH awareness in LCP procedure) or possible, the UE 10 sends the status report to any base station/cell. Then the status report is delivered between eNBs via X2 interface or the data forwarding may take the status report into account.

According to an implementation example of the invention, for single radio with CP in macro cell and UP in pico cell, similarly, upon RRC reconfiguration the eNB can explicitly indicate PDCP re-establishment and PDCP status report for a certain PDCP entity to be triggered even without HO.

According to an implementation example of the invention, data forwarding is performed between two pico cells/eNBs even if the macro cell/eNB does not change (i.e. without HO, as illustrated by the dashed line in FIG. 1). According to an alternative implementation example of the invention, data forwarding is done via the macro cell/eNB or between pico eNBs according to (S)cell de-configuration and (S)cell configuration. This is applicable for both CA and non-CA cases.

According to an implementation example of the invention, the IE is added in a message "RRCConnectionReconfiguration" (possible with or without mobility information) of 3GPP TS 36.331 v11.3.0, to indicate if PDCP re-establishment/PDCP status report is to be triggered or not. Optionally, the IE indicates to which radio bearers the PDCP re-establishment is limited. Optionally, the IE includes to which cell/eNB the status report should be sent. Alternatively, the eNB of the RAN 20 may configure the UE 10 to always send the first MAC PDU after (S)cell reconfiguration to a preferred cell/eNB, e.g. a newly configured (S)cell.

Upon reception of the RRC connection reconfiguration message, the UE 10 re-establishes the PDCP for the concerned radio bearers and sends the PDCP status report (or the first MAC PDU) to the indicated cell/eNB.

Figure 6:
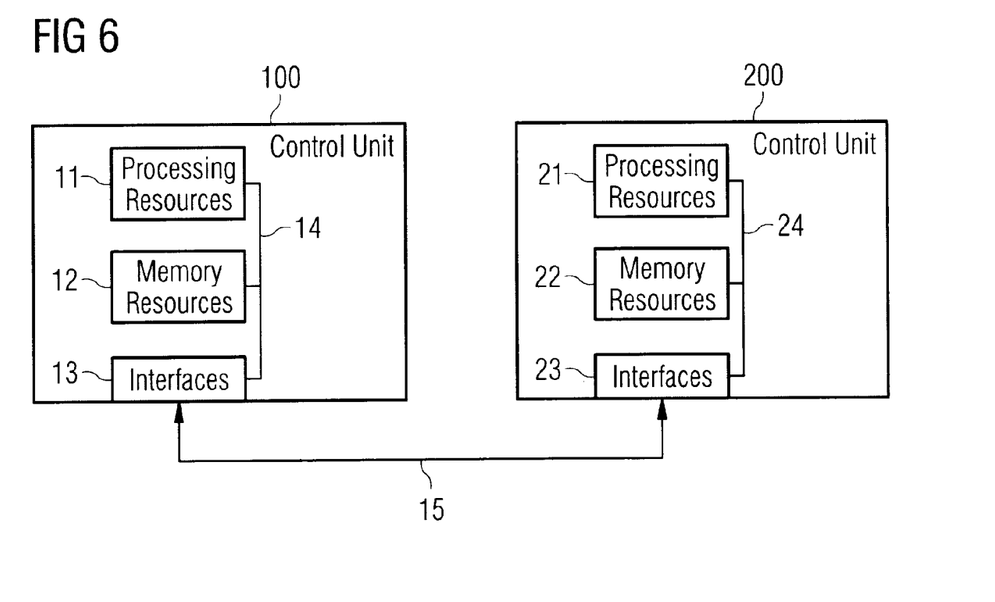
FIG. 6 shows a schematic block diagram illustrating a configuration of control units in which examples of embodiments of the invention are implementable.

Now reference is made to FIG. 6 for illustrating a simplified block diagram of various electronic devices that are suitable for use in practicing the exemplary embodiments of this invention.

A control unit 100 which may be part of or used by a UE e.g. to execute process 2 of FIG. 4B comprises processing resources 11, memory resources 12 and interfaces 14 which are connected via a link 14. The memory resources 12 may store a program.

The control unit 100 is connected to a control unit 200 through a link 15. The control unit 200 may be part of or used by an apparatus of a communication network, such as an apparatus of a RAN, e.g. a base station, eNB or the like, and may execute process 1 of FIG. 4A.

The control unit 200 comprises processing resources 21, memory resources 22 and interfaces 24 which are connected via a link 24. The memory resources 22 may store a program.

The interfaces 13, 23 each may include suitable radio frequency (RF) transceivers coupled to one or more antennas (not shown) for bidirectional wireless communications over the link 15.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the programs stored in the memory resources 12, 22 is assumed to include program instructions that, when executed by the associated processing resources 11, 21, enable the electronic device to operate in accordance with the exemplary embodiments of this invention, as detailed above. Inherent in the processing resources 11, 21 is a clock to enable synchronism among the various apparatus for transmissions and receptions within the appropriate time intervals and slots required, as the scheduling grants and the granted resources/subframes are time dependent. The transceivers include both transmitter and receiver, and inherent in each is a modulator/demodulator commonly known as a modem. The processing resources 21 are assumed to include a modem to facilitate communication over a (hardwire) link (not shown) between the control unit 200 and a GW (not shown).

In general, the exemplary embodiments of this invention may be implemented by computer software stored in the memory resources 12, 22 and executable by the associated processing resources 11, 21, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memory resources 12, 22 may be of any type suitable to the local technical environment and may be implemented using any suitable data storage technology, such as semiconductor-based memory devices, magnetic memory devices and systems, optical memory devices and systems, fixed memory and removable memory. The processing resources 11, 21 may be of any type suitable to the local technical environment, and may include one or more of general purpose computers, special purpose computers, microprocessors, digital signal processors (DSPs) and processors based on a multi-core processor architecture, as non-limiting examples.

According to an aspect of the invention, an apparatus of a communication network is provided. The apparatus comprises means for detecting that a modification of a radio resource control connection for a user equipment is required, means for deciding, based on the detected modification requirement, if a re-establishment of a packet data convergence protocol is required for a first radio bearer and/or a second radio bearer, and means for indicating, in a radio resource control reconfiguration message, the first radio bearer and/or the second radio bearer for which re-establishment of the packet data convergence protocol is required.

A packet data convergence protocol for the second radio bearer may be terminated in a second base station of the communication network, and a packet data convergence protocol for the first radio bearer may be terminated in a first base station of the communication network. Alternatively, the packet data convergence protocol for the first radio bearer may be terminated in the second base station of the communication network.

The means for deciding may decide, based on the detected modification requirement, that a packet data convergence protocol status report for the first radio bearer and/or the second radio bearer is to be sent by the user equipment, and the means for indicating may indicate, in the radio resource control reconfiguration message, that the status report is to be sent.

The means for deciding may decide to which base station of the communication network the status report is to be sent, and the means for indicating may indicate the base station in the radio resource control reconfiguration message.

The indicating means may add a dedicated information element to the radio resource control reconfiguration message to indicate the first radio bearer and/or the second radio bearer for which re-establishment of the packet data convergence protocol is required, and/or to indicate that the status report is to be sent, and/or to indicate the base station to which the status report is to be sent.

The apparatus may comprises a first base station, e.g. a macro eNB, via which the user equipment communicates using the first radio bearer, or a second base station, e.g. a pico eNB, via which the user equipment communicates using the second radio bearer.

The apparatus may comprise means for forwarding a status report received from the user equipment to the first or second base station or to a third base station of the communication network.

The apparatus may comprise the first base station and comprise at least a part of functionalities of the packet data convergence protocol for the second radio bearer.

The functionalities for the second radio bearer may comprise any of sequence number allocation, header compression, ciphering, integrity protection and/or reordering for uplink data.

The apparatus may be part of the RAN 20 shown in FIG. 5, and may execute process 1 shown in FIG. 4A. The apparatus may comprise or use the control unit 200 of FIG. 6. The detecting, deciding, indicating and forwarding means may be implemented by the processing resources 21, memory resources 22 and interfaces 23 of the control unit 200.

According to another aspect of the invention, a user equipment is provided, which comprises means for detecting, from a radio resource control reconfiguration message, that a modification of a radio resource control connection between the user equipment and a communication network is required, and means for re-establishing a packet data convergence protocol for a first radio bearer and/or a second radio bearer in accordance with an indication set in the radio resource control reconfiguration message.

The user equipment may communicate with the communication network by using the second radio bearer, or the user equipment may communicate with the communication network by using the first radio bearer and the second radio bearer.

The detecting means may detect, from the indication, that a packet data convergence protocol status report for the first radio bearer and or the second radio bearer is to be sent.

The detecting means may detect, from the indication, to which base station of the communication network the status report is to be sent.

The indication may comprise a dedicated information element added to the radio resource control reconfiguration message.

The user equipment may comprise the UE 10 shown in FIG. 5, and may execute process 2 shown in FIG. 4B. The user equipment may comprise or use the control unit 100 of FIG. 6. The detecting and re-establishing means and the communicating may be implemented by the processing resources 11, memory resources 12 and interfaces 13 of the control unit 100.

It is to be understood that the above description is illustrative of the invention and is not to be construed as limiting the invention. Various modifications and applications may occur to those skilled in the art without departing from the true spirit and scope of the invention as defined by the appended claims.

What is claimed is:

1. A method for use by an apparatus of a communication network, the method comprising:
   detecting that a modification of a radio resource control connection for a user equipment is required;

deciding, based on the detected modification requirement, if a re-establishment of a packet data convergence protocol is required for a first radio bearer and/or a second radio bearer,
wherein the packet data convergence protocol for the second radio bearer was terminated in a second base station of the communication network, and
wherein a packet data convergence protocol for the first radio bearer was terminated in a first base station of the communication network or in the second base station of the communication network;
indicating, in a radio resource control reconfiguration message, the first radio bearer and/or the second radio bearer for which re-establishment of the packet data convergence protocol is required; and
communicating with the user equipment by using the second radio bearer, or using the first radio bearer and the second bearer.

2. The method of claim 1, comprising:
deciding, based on the detected modification requirement, that a packet data convergence protocol status report for the first radio bearer and/or the second radio bearer is to be sent by the user equipment; and
indicating, in the radio resource control reconfiguration message, that the status report is to be sent.

3. The method of claim 1, the deciding comprising:
deciding to which base station of the communication network the status report is to be sent; and
indicating the base station in the radio resource control reconfiguration message.

4. The method of claim 1, wherein the apparatus comprises the first base station or the second base station.

5. A method for use by a user equipment comprising:
detecting, from a radio resource control reconfiguration message, that a modification of a radio resource control connection between the user equipment and a communication network is required;
re-establishing a packet data convergence protocol for a first radio bearer and/or a second radio bearer in accordance with an indication set in the radio resource control reconfiguration message;
communicating with the communication network by using the second radio bearer, or using the first radio bearer and the second radio bearer, wherein the packet data convergence protocol for the second radio bearer was terminated in a second base station of the communication network, and
wherein the packet data convergence protocol for the first radio bearer was terminated in a first base station of the communication network or in the second base station of the communication network.

6. The method of claim 5, comprising:
detecting, from the indication, that a packet data convergence protocol status report for the first radio bearer and or the second radio bearer is to be sent.

7. The method of claim 6, comprising:
detecting, from the indication, to which base station of the communication network the status report is to be sent.

8. An apparatus of a communication network, the apparatus comprising:
at least one processor and at least one memory including computer program code,
the at least one memory and the computer program code configured to cause the apparatus to:
detect that a modification of a radio resource control connection for a user equipment is required;
decide, based on the detected modification requirement, if a re-establishment of a packet data convergence protocol is required for a first radio bearer and/or a second radio bearer,
wherein a packet data convergence protocol for the second radio bearer was terminated in a second base station of the communication network, and
wherein a packet data convergence protocol for the first radio bearer was terminated in a first base station of the communication network or in the second base station of the communication network; and
indicate, in a radio resource control reconfiguration message, the first radio bearer and/or the second radio bearer for which re-establishment of the packet data convergence protocol is required.

9. The apparatus one of claim 8, wherein the at least one memory and the computer program code are further configured to cause the apparatus to:
decide, based on the detected modification requirement, that a packet data convergence protocol status report for the first radio bearer and/or the second radio bearer is to be sent by the user equipment; and
indicate, in the radio resource control reconfiguration message, that the status report is to be sent.

10. The apparatus of claim 9, wherein the at least one memory and the computer program code are further configured to cause the apparatus to:
decide to which base station of the communication network the status report is to be sent; and
indicate the base station in the radio resource control reconfiguration message.

11. The apparatus of claim 8, wherein the at least one memory and the computer program code are further configured to cause the apparatus to:
add a dedicated information element to the radio resource control reconfiguration message to indicate the first radio bearer and/or the second radio bearer for which re-establishment of the packet data convergence protocol is required, and/or to indicate that the status report is to be sent, and/or to indicate the base station to which the status report is to be sent.

12. The apparatus of claim 8, wherein the apparatus comprises the first base station via which the user equipment communicates using the first radio bearer, or the second base station via which the user equipment communicates using the second radio bearer.

13. A user equipment comprising:
at least one processor, at least one interface and at least one memory including computer program code,
the at least one memory and the computer program code configured to cause the user equipment to:
detect, from a radio resource control reconfiguration message, that a modification of a radio resource control connection between the user equipment and a communication network is required;
re-establish a packet data convergence protocol for a first radio bearer and/or a second radio bearer in accordance with an indication set in the radio resource control reconfiguration message; and
communicate, via the at least one interface, with the communication network by using the second radio bearer, or by using the first radio bearer and the second radio bearer.

14. The user equipment of claims 13, wherein the memory and the computer program code are further configured to cause the user equipment to:

detect, from the indication, that a packet data convergence protocol status report for the first radio bearer and or the second radio bearer is to be sent.

15. The user equipment of claim 14, wherein the memory and the computer program code are further configured to cause the user equipment to:

detect, from the indication, to which base station of the communication network the status report is to be sent.

\* \* \* \* \*